(12) United States Patent
Schuft

(10) Patent No.: US 6,753,886 B1
(45) Date of Patent: Jun. 22, 2004

(54) METHODS AND APPARATUS FOR COMMUNICATING MESSAGES IN A COMPUTER DISPLAY

(75) Inventor: Ryan J. Schuft, Woburn, MA (US)

(73) Assignee: Cisco Technology, Inc., San Jose, CA (US)

( * ) Notice: Subject to any disclaimer, the term of this patent is extended or adjusted under 35 U.S.C. 154(b) by 588 days.

(21) Appl. No.: 09/702,511

(22) Filed: Oct. 31, 2000

(51) Int. Cl.[7] .................................................. G09G 5/00
(52) U.S. Cl. ....................... 345/764; 345/781; 345/803; 345/804; 345/805; 719/316
(58) Field of Search ................................. 345/781, 764, 345/748, 733, 803–809, 763; 709/206, 316; 716/316

(56) References Cited

U.S. PATENT DOCUMENTS

| | | | | |
|---|---|---|---|---|
| 5,734,903 A | * | 3/1998 | Saulpaugh et al. ......... | 709/316 |
| 5,742,284 A | * | 4/1998 | Duggan et al. ............. | 709/316 |
| 5,754,808 A | * | 5/1998 | Tanaka et al. .............. | 345/763 |
| 6,092,101 A | * | 7/2000 | Birrell et al. ............... | 709/206 |

* cited by examiner

Primary Examiner—Cao (Kevin) Nguyen
Assistant Examiner—Cuong T. Thai
(74) Attorney, Agent, or Firm—Chapin & Huang, LLC; Barry W. Chapin, Esq.

(57) ABSTRACT

The invention is directed to techniques for communicating messages between windows or frames in a computer display. A computer system suited for use with the invention includes a computer display providing a source window and a target window, as well as respective source display code and target display code associated with each window. A messaging module coordinates the communication of messages and supports a database of target identifiers that identify windows, functions, and message handlers associated with the windows. The source display code originates a message with selection information and provides the message to the messaging module, which uses the selection information to determine which window to send the message to based on the target identifiers in the database.

39 Claims, 7 Drawing Sheets

390-1

```
<HTML>
<HEAD><TITLE>Message Framework Examples</TITLE></HEAD>            ⎫
<BODY>                                                             ⎬ 302
<XMP>                                                              ⎪
<HTML>                                                             ⎪
<HEAD>                                                             ⎪
<TITLE>Message Framework Examples</TITLE>                          ⎭

<!-- Including the Message Framework source file -->
<SCRIPT SRC="/content_server/ui_server/js/message_framework.js"></SCRIPT>   ⎯304

<SCRIPT>
var chatWin = window.open("../chat/chat.html", "chatWin", "height=250,width=500");   ⎯306

(new Container(chatWin)).add("chatWin1");   ⎯308 function testFunc1(str1, str2)    ⎫
{                                  ⎬ 310
    alert("test1: " + str1 + " " + str2);
};                                 ⎭ function testFunc2(str1, str2)    ⎫
{                                  ⎬ 312
    return "test2: " + str1 + " " + str2;
};                                 ⎭
```

FIG. 5A

```
(new Target(testFunc1)).add("testing1", null, MSG_FUNCTION);         ⌐314
(new Target(testFunc2)).add("testing2", null, MSG_FUNCTION);         ⌐316
function testHandler(mObj)    ⌐318
{
    if (mObj.myData)   ⌐320
    {
        alert(mObj.myData);    ⌐322
    }
    else
    {
        var alertMsg = "Message Name: " + mObj.name + "\n";      ⎫
        alertMsg += "Message Filter: " + mObj.filter + "\n";      ⎬ ⌐324
        alertMsg += "Message Origin: " + mObj.path[0];            ⎪
        alert(alertMsg);                                          ⎭
    }
    return new MessageReceipt(true, null);    ⌐326
};

(new Target(testHandler)).add(null, null, MSG_HANDLER);              ⌐328
(new Message("string one", "string two")).send("testing1", null, MSG_EVENT);   ⌐330
(new Message("string one", "string two")).send("testing1", null, MSG_ASYNC);   ⌐332
```

```
var msg = new Message("string one", "string two");
var myAlert = msg.send("testing2", null, MSG_COMMAND);     }-334
var myAlert2 = msg.send("testing2", null, MSG_COMMAND);   —336 alert(myAlert);      }-338
alert(myAlert2);

var msg = new Message("string one", "string two");
msg.myData = "this is extended data";                      }-340
msg.send("testing1", null, MSG_EVENT);

var msg = new Message("string one", "string two");
msg.myData = "this is extended data";                      }-342
msg.send("testing1", null, MSG_ASYNC);

var msg = new Message("string one", "string two");
msg.myData = "this is extended data";                      }-344
var myResults = msg.send("testing2", null, MSG_COMMAND);

alert(myResults);     —346
</SCRIPT>

</HEAD>
<BODY onload="addDefaultContainers();">
                                                       }-348
</BODY>
</HTML>
</XMP>
</BODY>
</HTML>
```

FIG. 5C

METHODS AND APPARATUS FOR COMMUNICATING MESSAGES IN A COMPUTER DISPLAY

BACKGROUND OF THE INVENTION

Historically, computer systems provided a command-line interface for the programmer or other user of a computer system. Modern computer systems provide a graphic display for the user. Typically, the user of a modern computer system sees and interacts with several windows or frames on a display associated with the computer system. For example, a user selects a window using a mouse or keyboard and enters data or a command in the window. The user can make a selection in one window that requests the display in a second window of a spreadsheet or other data report obtained from a database or over a network. The user can then make further requests that change data in the second window. For example, the user can request that the format of the data displayed in the second window be changed or that the data report be replaced by some other data report.

In general, initiatives or interactions by the user in one window lead to results or changes in displays in another window. In effect, the user initiates a message from one window that is communicated to the second window. The message may be acted upon by scripts or program code associated with the second window to cause some change in the display in the second window or some other effect, or text provided in the message may be displayed in the second window.

Typically, the windows (or frames) are associated with each other, for example, in a hierarchical set of windows. Alternatively, one window may be the "opener," that is, the window that opened the second window for display on the computer's display at some previous point in time. Thus, each source window originating a message has some relationship to the target window that is to the receive the message. Typically, a script associated with the source window directs the message to the target window based on this relationship.

In one conventional approach, the windows are frames in a network browser, and scripts, such as scripts based on JavaScript™ from Sun Microsystems Inc., are associated with each window. A script associated with a source frame typically generates a message based on the user's actions, using JavaScript conventions, to send to a target frame to receive the message based on the relationship between the source frame and the target frame. Each frame typically has some explicit relationship to other frames in the display. For example, one frame may be related to another frame by being the parent of that frame, that is, the frame is a parent frame in a hierarchy of parent-child frames. Alternatively, a frame may be the opener of another frame without being the parent of the opened frame.

SUMMARY OF THE INVENTION

As described previously, the windows (or frames) shown on a conventional computer display are associated with each other, for example, in a hierarchical set of windows (e.g., frameset). For example, a conventional script (or programming code) for the window that is the source of the message must specify explicitly where the target window is in the hierarchy windows relative to the source window. Alternatively, conventional systems require that the windows have some other relationship, such as an opener relationship between the source window and the target window. In this case, the script for the source window must explicitly indicate this relationship between the source window and the target window. In some conventional systems, the relationship is stated explicitly, although referred to in a shorthand form, as when the highest level window in the hierarchy (e.g., frameset) can be referred to as the "top" window (e.g., top of a frameset) without explicitly referring to every window in the hierarchy.

As applications displayed in browsers for the web (e.g. World Wide Web or WWW) have become more complex, a large number of windows or frames in a network browser (e.g. web browser) may be open at one time for display to a user. Typically, conventional applications are implemented in a number of relatively small scripts (e.g. JavaScript code) associated with each window in the application. The conventional script associated with each window can generate messages to be sent to one or more of the other windows. With the increasing complexity of these window-based conventional applications, the writing and maintaining of the scripts becomes increasingly difficult if the relationship of each target window must be stated explicitly when sending a message to the target window. A single change in the hierarchy or relationships among the windows may require changes in many scripts associated with many windows, because each script for each window refers explicitly to the other locations of other windows in the hierarchy (e.g., locations in a frameset) when sending messages to those other windows.

Thus, there is a need for an approach that allows windows to be specified without specifying the hierarchy or relationship among the windows explicitly. The approach of the invention allows for relationships to other windows to be referred to implicitly. For example, if a source window is directing a message to a specific function in another window when using the approach of the invention, then the message in the source window need only refer to the name or identifier of the function (e.g., by a target identifier) and does not need to describe explicitly the relationship between the source window and the target window. In another example of the approach of the invention, the message need not refer to any target identifier, and the message is passed to message handlers associated with each window, without explicit references to the relationships between the source window and every other window.

Using the techniques of the invention, one or more messaging modules register target identifiers for windows, message handlers, and functions in a database. In one embodiment, there is a messaging module and database associated with each window. Thus each source window script can refer to a database to locate windows that the source window is related to. The source window script originates a message, which is sent to the windows that the source window has identified in the database. If the message refers to a function, then scripts for each of the other windows determines whether the target identifier for the function is one registered for that other window. If a match is found with the target identifier for the function in a window, then the message is passed to that function. Otherwise, the message may be passed to other windows indicated in the database. If the message (e.g., broadcast message to be sent to all windows) does not indicate any explicit function identifier, then the message is passed to the message handlers that are registered for each window.

In one embodiment, the invention is directed to a method for communicating messages between display constructs (e.g. windows or frames) presented on a display of a computer system. The method includes the steps of recording target identifiers associated with display constructs in a database, receiving a message comprising selection information (e.g., reference to a target identifier) suitable for use in selecting one of the display constructs to receive the message, and forwarding the message to one of the display constructs based on the selection information and the target identifiers in a database. Each target identifier identifies one or more aspects of a respective display construct. For example, the target identifier identifies the name of a window, the name of a function associated with a window, or some other aspect of a window (or frame). Thus, a target identifier, such as a function and/or window name, is recorded in a database, and the message selection information identifies the function name. A messaging module (or other script or program) compares the function name in the message to the function names in the database, finds the function name in the database, and passes the message to the identified function, which is typically in a script or other code associated with the target window. Thus the message is sent without explicitly identifying the relationship between a source (e.g., source script associated with the source window sending the message) and the target (e.g. function associated with the target window receiving the message).

In another embodiment, the method includes recording identities of software entities, each software entity providing processing instructions in relation to each respective display construct. For example, a software entity is a function or a message handler implemented in a script or code associated with the display construct. Thus, a message is sent, for example, to a function based on the recorded identity of the function.

The method includes, in another embodiment, receiving the message independently of an identification of a specific display construct suitable for receiving the message. Thus, the message does not have to specify the identity of a window in order for the window (or code associated with the window) to receive the message.

In a further embodiment, the method includes traversing the database to select a set of display constructs based on the selection information and forwarding the message to the set of display constructs. Another embodiment of the method includes using a filter to select one or more display constructs and forwarding the message to one or more display constructs. For example, a messaging module uses selection information and/or a filter to identify several targets (e.g., windows) to receive the message and forwards the message to those windows, without having to identify each target separately.

In a further embodiment, the method includes instantiating a message framework in the computer system, and instantiating a message object in the messaging framework, wherein the message object includes associated message functions and message data. Thus, the method uses an object oriented approach to generate a message object, and includes additional data (e.g., extended message data) in the message object.

In one embodiment, the invention is directed to an apparatus for communicating messages between display constructs (e.g., windows or frames) presented on a display of a computer system, including a database, and a messaging module. The messaging module is configured to record target identifiers associated with display constructs in a database, to receive a message including selection information suitable for use in selecting one of the display constructs to receive the message, and to forward the message to one of the display constructs based on the selection information and the target identifiers in the database. Each target identifier identifies one or more aspects of a respective display construct. For example, the target identifier identifies the name of a window, the name of a function associated with a window, or some other aspect of a window (or frame). Thus, a target identifier, such as a function and/or window name, is recorded in a database, and the message selection information identifies the function name. A messaging module (or other script or program) compares the function name in the message to the function names in the database, finds the function name in the database, and passes the message to the identified function, which is typically in a script or other code associated with the target window. Thus the message is sent without explicitly identifying the relationship between a source and the target.

In another embodiment, each target identifier includes the identity of a software entity that provides processing instructions in relation to each respective display construct. For example, a software entity is a function or a message handler implemented in a script or code associated with the display construct. Thus, a message is sent, for example, to a function based on the recorded identity of the function.

In a further embodiment, the messaging module is configured to receive the message independently of an identification of a specific display construct suitable for receiving the message. Thus, the message does not have to specify the identity of a window in order for the window (or code associated with the window) to receive the message.

The messaging module, in another embodiment, is configured to traverse the database to select a set of display constructs based on the selection information and forward the message to the set of display constructs. In a further embodiment, the messaging module uses a filter to select one or more of the display constructs and the messaging module forwards the message to the selected display constructs. For example, a messaging module uses selection information and/or the filter to identify several targets (e.g., window) to receive the message and forwards the message to those windows, without having to identify each target separately.

In another embodiment, the messaging module is a messaging framework instantiated in the computer system; the message is an instantiation of a message object in the messaging framework; and the message comprises associated message functions and message data. Thus, the messaging module uses an object oriented approach to generate a message object, and includes additional data (e.g., extended message data) in the message object.

In a further embodiment, the display constructs are windows displayed in one or more network browsers executing on the computer system, and each target identifier identifies one of the windows. For example, the display constructs are frames based on HTML (hypertext markup language) pages displayed in a web browser.

In one embodiment, the invention is directed to an apparatus for communicating messages between display constructs (e.g., windows or frames) presented on a display of a computer system, including a database, and a means for processing messages. The processing means is configured to record target identifiers associated with display constructs in a database, to receive a message comprising selection information suitable for use in selecting one of the display constructs to receive the message, and to forward the message to one of the display constructs based on the selection information and the target identifiers in the database. Each target identifier identifies one or more aspects of a respective display construct. For example, the target identifier identifies the name of a window, the name of a function associated with a window, or some other aspect of a window (or frame). Thus, a target identifier, such as a function and/or window name, is recorded in a database, and the message selection information identifies the function name. The processing means compares the function name in the message to the function names in the database, finds the function name in the database, and passes the message to the identified function, which is typically in a script or other code associated with the target window. Thus the message is sent without explicitly identifying the relationship between a source and the target.

In a further embodiment, the invention is directed to a computer program product that includes a computer readable medium having instructions stored thereon for communicating messages between display constructs (e.g., windows or frames) presented on a display of a computer system, such that the instructions, when carried out by a computer, cause the computer to perform any or all of the operations of the invention disclosed herein. For example, the instructions cause the computer to record target identifiers associated with display constructs in a database, receive a message comprising selection information suitable for use in selecting one of the display constructs to receive the message, and forward the message to one of the display constructs based on the selection information and the target identifiers in the database. Each target identifier identifies at least one aspect of a respective display construct;

In one embodiment, the invention is directed to a method for communicating messages between display constructs (e.g., windows or frames) presented on a display of a computer system. The method includes recording a target identifier that identifies a software entity associated with a first display construct, generating a message including the target identifier based on a request from a second display construct, and transferring the message from the second display construct to the software entity in the first display construct based on the target identifier. For example, the target identifier identifies a software entity that is the name of a function or message handler associated with a window (or frame). The target identifier is recorded in a database, memory or other storage device, and the target identifier provides a way to determine the target window (or software entity associated with the window) for the message.

In another embodiment, the method includes generating the message independently of an identification of the first display construct and identifying the first display construct based on the target identifier recorded in the database. Thus, the message is sent based on the target identifier without explicitly identifying the relationship between a source and the target.

In a further embodiment, the invention is directed to an apparatus for communicating messages between display constructs (e.g. windows or frames) presented on a display of a computer system, including a database, a first messaging module associated with a first display construct, and a second messaging module associated with a second display construct. The second messaging module is configured to record in the database a target identifier that identifies a software entity that provides processing instructions in relation to the first display construct, to generate a message comprising the target identifier based on a request from the second display construct, and to transfer the message to the first messaging module based on the target identifier recorded in the database. For example, the target identifier identifies a software entity that is the name of a function or message handler associated with a window (or frame). The target identifier is recorded in a database, memory or other storage device, and the target identifier provides a way to determine the target window (or software entity associated with the window) for the message.

In another embodiment, the second messaging module is configured to generate the message independently of an identification of the first display construct. Thus, the message is sent based on the target identifier without explicitly identifying the relationship between a source and the target.

In a further embodiment, the first messaging module and second messaging modules are JavaScript code associated with one or more HTML pages and the first display construct and second display construct are browser windows. For example, the display constructs are frames based on HTML and JavaScript displayed in one or more web browser windows.

In another embodiment, the software entity is either a function or a message handler.

In one embodiment, the invention is directed to an apparatus for communicating messages between display constructs (e.g., windows or frames) presented on a display of a computer system, including a database, a first means for processing messages associated with a first display construct, and a second means for processing messages associated with a second display construct. The second processing means is configured to record in the database a target identifier that identifies a software entity that provides processing instructions in relation to the first display construct, to generate a message comprising the target identifier based on a request from the second display construct, and to transfer the message to the first processing means based on the target identifier recorded in the database. For example, the target identifier identifies a software entity that is the name of a function or message handler associated with a window (or frame). The target identifier is recorded in a database, memory or other storage device, and the target identifier provides a way to determine the target window (or software entity associated with the window) for the message.

In a further embodiment, the invention is directed to a computer program product that includes a computer readable medium having instructions stored thereon for communicating messages between display constructs (e.g., windows or frames) presented on a display of a computer system, such that the instructions, when carried out by a computer, cause the computer to perform any or all of the operations of the invention disclosed herein. For example, the instructions cause the computer to record a target identifier that identifies a software entity associated with a first display construct, to generate a message including the target identifier based on a request from a second display construct, and to transfer the message from the second display construct to the software entity in the first display construct based on the target identifier.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A, 5B, and 5C illustrates sample scripts that record containers, functions, and message handlers in a database, generate messages, and send the messages based on the recorded information, according to one embodiment of the invention.

DETAILED DESCRIPTION

The invention is directed to a technique for communicating messages between windows on a graphics display of a computer system. In a preferred embodiment, described in more detail later, the invention is suitable for use by a messaging framework in communicating messages between scripts based on JavaScript code that are associated with frames displayed by a web browser. In an example of an operation, one or more messaging modules (e.g., messaging frameworks) register target identifiers in a database. The target identifiers identify windows (e.g. frames) and/or aspects of the windows, such as functions associated with the windows. A script (e.g. JavaScript code) associated with a source window originates (e.g., creates and transmits) a message that includes a target identifier, such as the function name. Thus, the message refers to the function name and is not required to refer explicitly to the window name or specify an explicit relationship between the source window and the target window, such as identifying the relative positions of the source and target windows in a hierarchy of windows. The messaging module receives the message and determines the identity of the target identifier from the database. The messaging then passes the message to the function indicated by the target identifier. If the message does not indicate an explicit target identifier, then the messaging module passes the message on to a message handler associated with each window, for example, when broadcasting a message intended for all windows in the display. In this manner, the invention avoids any requirement that the script originating the message explicitly specify the relationship of the target window to the source window (e.g., defining the location of the target frame in a hierarchy or frameset relative to the source frame).

In another embodiment, a messaging module and database is associated with each window, and, for each window, the messaging module records identifiers for other related windows. For example, the window has an opener relationship, if it opened another window for presentation on the display of the computer system. If the messaging module receives a message but does not identify the target identifier specified in the message, the messaging module passes the message on to the other windows listed in the database for that window. Thus, the message continues to be passed on to other windows until the target identifier in the message is located. In this manner, the invention allows for a message to be passed from the source window to other windows without specifying a long list or "chain" of other windows explicitly defining some relationship between the source window and the target window. Thus, one or more messaging frameworks can pass a message across framesets, without specifying the framesets explicitly.

Figure 1:
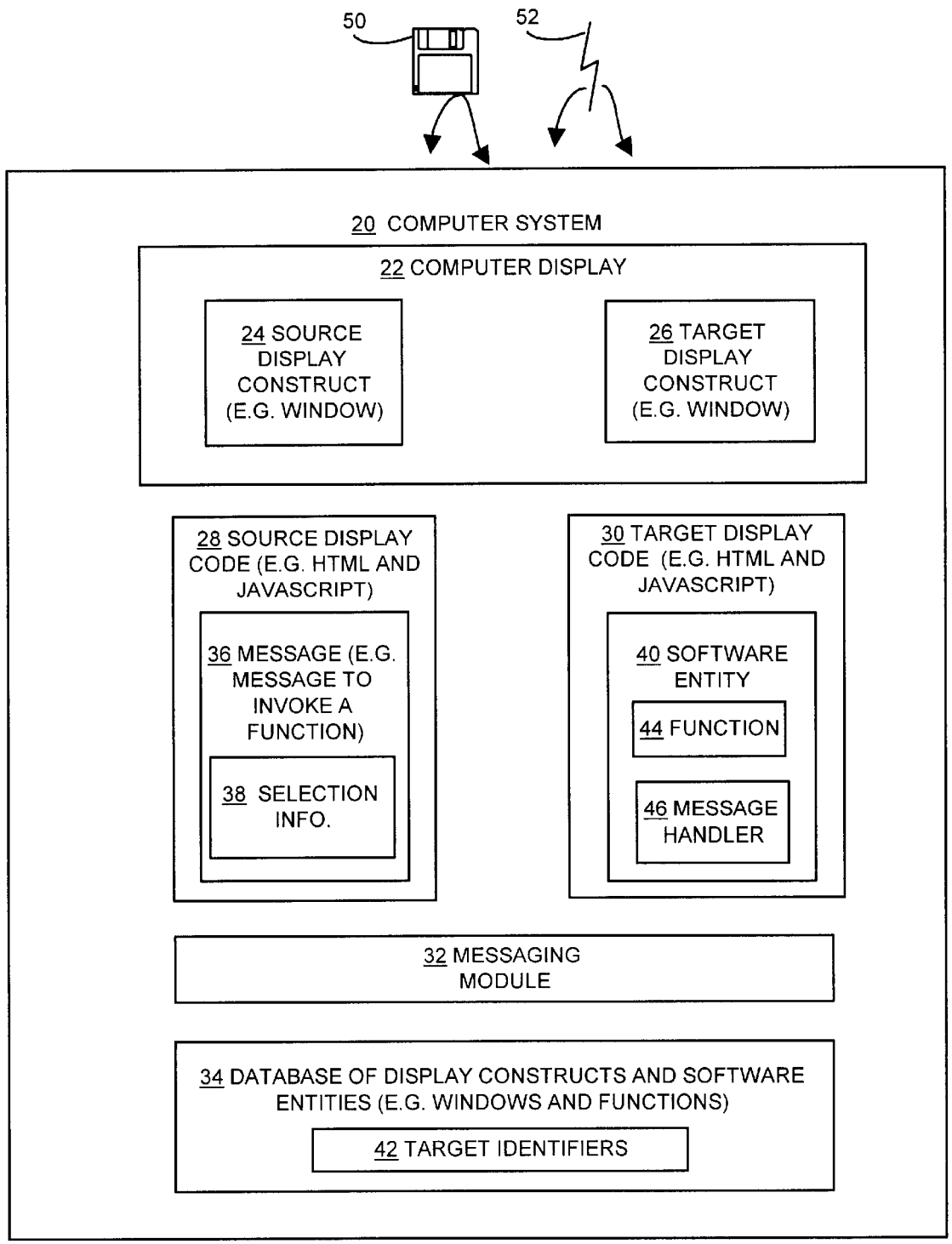
FIG. 1 shows a block diagram of a computer system including a computer display, source display code, target display code, messaging module, and database of display constructs and software entities, according to one embodiment of the invention.

FIG. 1 illustrates a computer system 20 including a computer display 22, source display code 28, target display code 30, messaging module 32, and database 34 of display constructs and software entities configured according to one embodiment of the invention. In a high-level summary of the process of communicating a message, source display code 28 (e.g. a script) generates a message 36 that is sent to a software entity 40 (e.g., a function 44) implemented in the target display code 30 (e.g., script) associated with the target display construct 26 (e.g., window). This process will be discussed in more detail later (see e.g. FIG. 2).

The computer system 20 is a digital data processing system. In one embodiment, the computer system 20 is an IBM-compatible PC. In different embodiments, the computer system 20 is a desktop, laptop, palmtop, or other configuration of personal computer. The source display code 28 and target display code 30 perform (e.g., execute) on the computer system 20. It will be understood, in general, that references to source display code 28 and target display code 30 refer to the code performing on the computer system 20.

The computer display 22 is a visual and/or graphics display presenting the output of the computer in a visual format for use by a human user of the computer system 20. In one embodiment, the graphics display is a CRT display or a flat display (e.g. active matrix LCD). The computer display 22 presents a source display construct 24 and a target display construct 26. In one embodiment, the display constructs 24, 26 are windows presented in a window-oriented software system or window-oriented operating system. In another embodiment, the display constructs 24, 26 are implemented as objects in JavaScript that operate with a web browser to provide frames presented to a user of the web browser.

The source display code 28 and target display code 30 are programming code and/or scripts that generate and control the source display constructs 24, 26 respectively. In one embodiment, the display code 28, 30 are based on HTML pages and include scripts based on JavaScript, as will be discussed in connection with the sample code illustrated in FIGS. 5A, 5B, and 5C.

The source display code 28 generates a message 36, for example, to invoke a function to display an output in the target display construct 26. The message 36 is a string of information (e.g., string of text or other data) providing selection information 38 suitable for identifying the recipient of the message 36, such as a software entity 40 that is part of the target display code 30. The software entity 40 provides processing instructions related to its respective display construct (e.g. target display construct 26). The software entity 40 is a software construct such as a script, routine, program, function, object, or other software construct. For example, the software entity 40 is a function 44 that may affect the target display construct 26 when invoked and can return any suitable result to the source display code 28. In another example, the software entity 40 is a software message handler 46 that processes the message 36 when received and returns a message receipt object indicating that the message 36 was received. The message 36 includes selection information 38, which is a text string, packet of data, or other information suitable for use in selecting code (e.g., 30) for one of the display constructs (e.g., 26) to receive the message 36. For example, the selection information 38 includes the name of the software entity 40 associated with the target display construct 26 (e.g., a function name associated with a window and implemented in a script associated with that window). In one embodiment, the message 36 is a message object. In a further embodiment, the message object 36 is extended to incorporate additional data than the default or typical data include in such a message 36 (to be discussed in more detail later).

The messaging module 32 is, for example, an application, script, program, object, or other software module that performs on the computer system 20 and provides message coordination and message functions among the database 34, the source display code 28, and the target display code 30. In another embodiment, each display construct 24, 26 has its own messaging module 32 and its own separate database 34 (see e.g., FIG. 3).

The database 34 is a database of display constructs (e.g. references to windows and/or frames) and software entities 40 (e.g. references to functions 44 and/or message handlers 46). The database 34 is stored, for example, on a hard disk drive, in a RAM memory, or other memory or storage devices suited for use with the computer system 20. The database 34 includes target identifiers 42, which provide identifiers, such as names, that identify an aspect of a display construct (e.g., 26). For example, a target identifier 42 is the name of a window or frame displayed on the display of the computer system 20. In another example, the target identifier is the name of a function 44 that is associated with a window and defined in a script (e.g. target display code 30) associated with the window (e.g., target display construct 26).

In one embodiment, a computer program product 50 including a computer readable medium (e.g. one or more CDROM's, diskettes, tapes, etc.) provides software instructions for the messaging module 32. The computer program product 50 can be installed by any suitable software installation procedure, as is well known in the art. In another embodiment, the software instructions can also be downloaded over a wireless connection. A computer program propagated signal product 52 embodied on a propagated signal on a propagation medium (e.g. a radio wave, an infrared wave, a laser wave, sound wave, or an electrical wave propagated over the Internet or other network) provides software instructions for the messaging module 32. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 50 is a propagation medium that the computer can receive and read, such as by receiving the propagation medium and identifying a propagated signal embodied in the propagation medium, as described above for the computer program propagated signal product 52.

Figure 2:
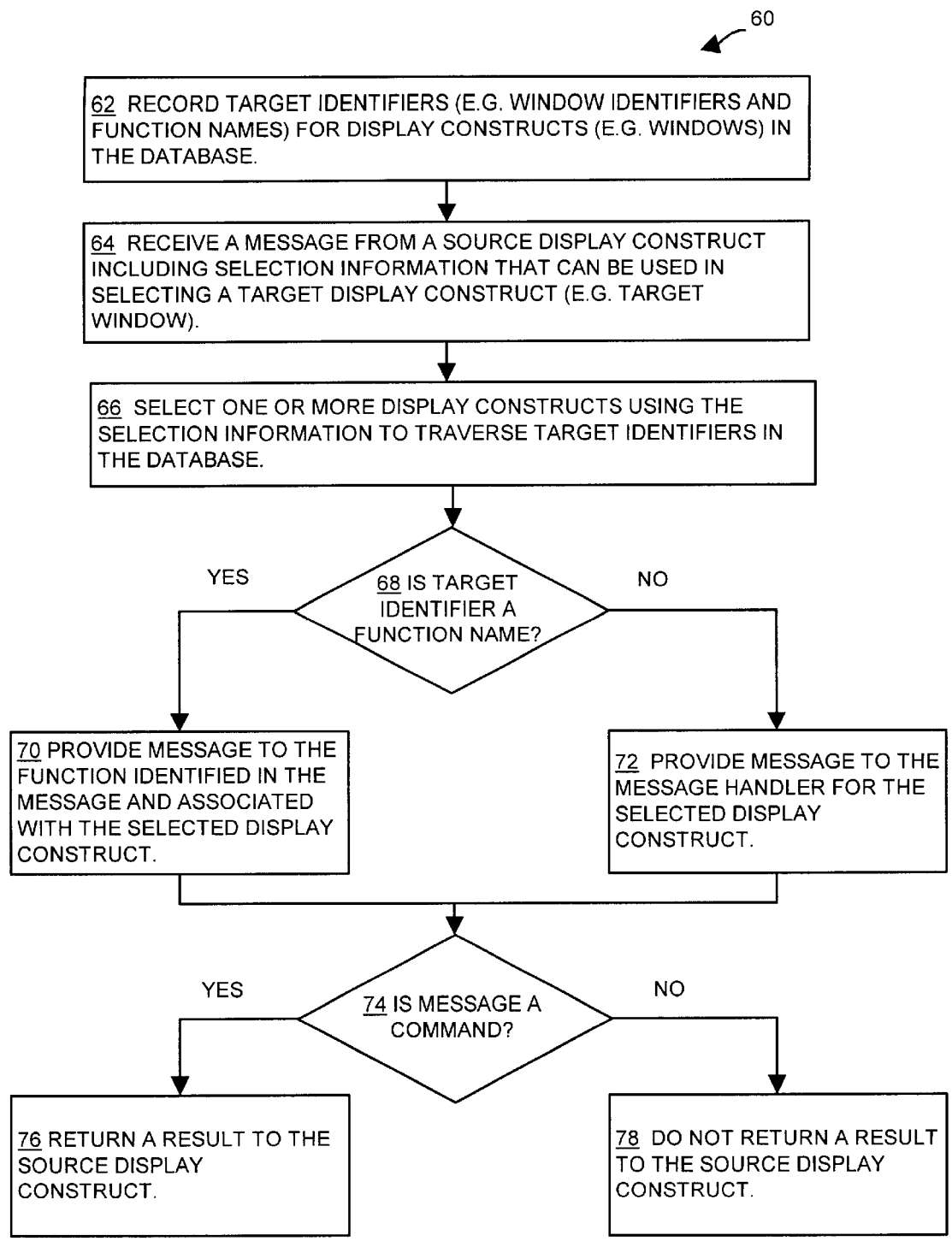
FIG. 2 is a flowchart of a procedure for recording target identifiers in a database, receiving a message based on a target identifier, and processing the message, according to the embodiment of the invention shown in FIG. 1.

FIG. 2 is a flowchart of a procedure for recording target identifiers 42 in a database 34, receiving a message 36 based on a target identifier 42, and processing the message 36, according to one embodiment of the invention.

In step 62, the messaging module 32 records target identifiers 42 (e.g., window identifiers and/or function names) associated with display constructs 24, 26 (e.g., windows or frames in a web browser) in the database 34. For example, a function 44 implemented in the target code 30 may register itself in the database 34 as a target.

In step 64, the messaging module 32 receives a message 36 from a source display construct 24. For example, the source display code 28 (e.g. script) associated with the source display construct 24 may define a message 36 and then send the message 36 to the messaging module 32. The message 36 includes selection information 38 that can be used in selecting a target display construct 26 (e.g., target window or frame) to receive the message 36.

In step 66, the messaging module 32 uses the selection information 38 to traverse target identifiers 42 stored in the database 34 and to select one or more display constructs (e.g., 26) to receive the message. The messaging module 32 selects a target identifier 42 when the target identifier 42 matches an identifier provided in the selection information 38. In one embodiment, the message 36 is received by target display code 30 associated with the target display construct 26 and is processed by the target display code 30 (e.g., function 44).

In step 68, the messaging module 32 determines whether the target identifier 42 is a function name or some other designator, such as "null", which, for example, indicates that the message 36 is to be sent to any other display construct (e.g., 26) listed in the database 34, even though the target display construct (e.g., 26) is not explicitly named in the selection information 38 in the message 36. In other words, the invention allows the source display code 28 to send a message 36 without knowing the precise identity or location (e.g., in a frameset) of the target.

In step 70, the messaging module 32 provides the message 36 to the function 44 identified in the selection information 38 in the message 36 and associated with the selected display construct (e.g., 26). The function 44 then processes the message 36. In effect, the message 36 invokes the function 44 based on the text or other input parameters provided by the message 36. For example, the function 44 displays the input text provided by the message 36 in the target display construct 26. In another example, the function 44 performs calculations based on the input parameters provided in the message 36 and then causes the data displayed in the target display construct 26 to change based on the calculations.

In step 72, a value of "null" or other nonspecific designator in the message 36 means that the messaging module 32 sends the message 36 to a message handler 46 implemented in the target display code 30 associated with the target display construct 26. For example, the message 36 may require all windows to refresh the data being displayed in each window, and the message handler 46 for each window handles the refresh request contained in the message 36.

In step 74, the message module 32 determines if the message 36 is a command. In one embodiment, a command is one of several delivery types for a message 36. In a command type message, the message 36 includes, for example, a constant value of MSG_COMMAND. If the message 36 is a command type, then the message 36 is delivered to the first matching target indicated by a target identifier 42 in the database 34 and returns a result. For example, if the selection information 38 provides a function name, then the messaging module 32 delivers the message 36 to the function 44 indicated by the first target identifier 42 located that matches that function name, and returns a result from the function 44 to the source display code 28. The message 36 may also include, for example, a constant value of a MSG_EVENT for an event message, which is sent to all target identifiers 42 listed in the database 34, and always returns a null value. The message 36 may also include, for example, a constant value of MSG_ASYNC, which indicates an asynchronous message. In this case, the messaging module 32 returns a null value, and then delivers the message 36 to all matching targets.

In step 76, the message 36 is a command type, which returns a result. The messaging module 32 returns the result to the source display construct code 28 that initiated the message 36.

In step 78, the message 36 is not a command type. The messaging module 32 does not return a result to the source display construct code 28 that initiated the message 36.

In a further embodiment, the message 36 is a result set type including the constant value MSG_RESULTSET and the message 36 is sent to every target identified by a target identifier 42 that matches the selection information 38 in the message 36. The messaging module 32 delivers the message 36 to every matching target (e.g., every target indicated by a match between the selection information 38 in the message 36 and the target identifiers 42 in the database 34). The messaging module 32 collects the results from every matching target and returns a set of the results to the source display code 28 that initiated the message 36.

Figure 3:
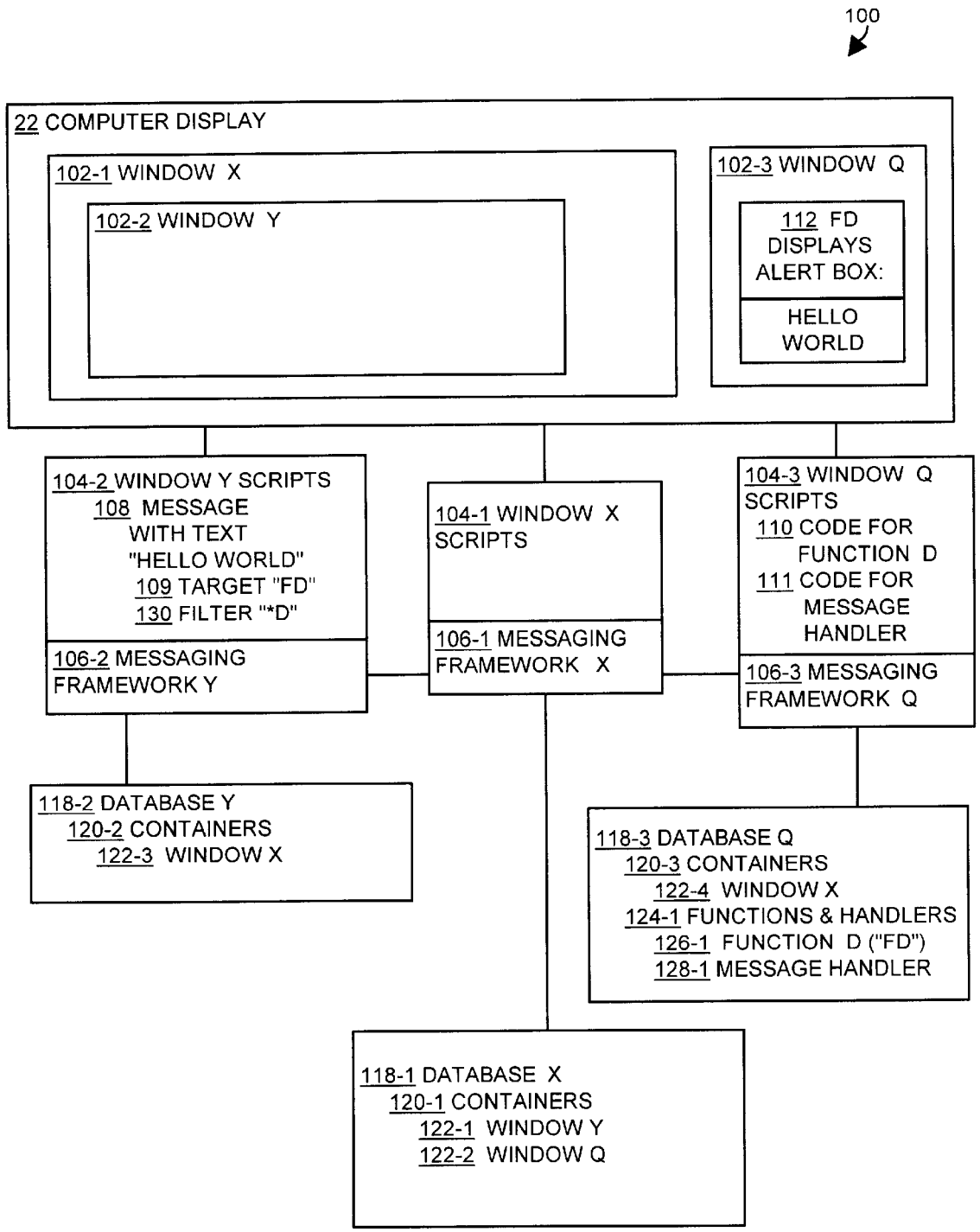
FIG. 3 shows, by way of example only, a block diagram of window scripts, messaging frameworks, and databases associated with windows presented in the computer display.

FIG. 3 shows a block diagram of a computer display 22 including windows 102-1, 102-2, 102-3 (referred to generally as window 102). FIG. 3 also illustrates window scripts 104-1, 104-2, 104-3 (referred to generally as script 104), messaging frameworks 106-1, 106-2, 106-3 (referred to generally as messaging framework 106), and databases 118-1, 118-2, 118-3 (referred to generally as database 118) associated with each window 102, according to one embodiment of the invention.

The windows 102 are examples of the display constructs 24, 26 illustrated in FIG. 1. The window scripts 104 are examples of the target display code 28, 30 shown in FIG. 1. The messaging frameworks 106 are examples of the messaging module 32 illustrated in FIG. 1. The databases 118 are examples of the database 34 shown in FIG. 1.

Each window 102 has an associated script 104, messaging module 106, and database 118. Window X 102-1 has an associated script 104-1, an associated messaging framework 106-1, and an associated database 118-1. Window Y 102-2 has an associated script 104-2, an associated messaging framework 106-2, and an associated database 118-2. Window Q 102-3 has an associated script 104-3, an associated messaging framework 106-3, and an associated database 118-3.

The message framework 106 for each window 102 provides entries for each database 118 based on instructions provided by each script 104. Each database 118 can include entries in a container category 120-1, 120-2, 120-3 (referred to generally as container category 120). Typically, a container category 120 includes entries referring to a window or frame 102 displayed on the computer display 22. The window or frame (e.g. window X 102-1) serves as a software container that may contain data, objects, or other software constructs. In other embodiments, the container entries 120 refer to other types of software containers, such as objects or data structures, which may or may not be displayed on the computer display 22. The window X script 104-1 provides instructions to the window X messaging framework 106-1 to provide entries in the window X database 118-1 under the container category 120-1, including entries for window Y 122-1 and window Q 122-2. The window Y script 104-2 provides instructions to the window Y messaging framework 106-2 to provide entries in the window Y database 118-2 under the container category 120-2, including an entry for window X 122-3. The window entries 122-1, 122-2, 122-3, 122-4 are referred to generally as window entry 122.

Each database 118 can include entries in a functions and handlers category 124-1, (referred to generally as functions and handlers category 124). The databases 118 in FIG. 3 are shown by way of example only, and each database 118 may include one, none, or both of a container category 120 and a functions and handlers category 124. The entries in the container category 120 and in the functions and handlers category 124 are examples of the target identifiers 42 shown in FIG. 1.

Typically, a functions and handlers category 124 includes entries referring to a software entity 40 (e.g., function 44 or message handler 46) implemented in a script 104 associated with the window 102. The window Q script 104-3 provides instructions to the window Q messaging framework 106-3 to provide entries in the window Q database 118-3 referring to window X 122-4 under the container category 120-3 and entries referring to function D ("FD") 126-1 and a message handler 128-1 under the functions and handlers category 124-1. The FD in the entry 126-1 (referred to generally as function entry 126) refers to code for function D 110 that is provided in the window Q scripts 104-3. The message handler in the entry 128-1 (referred to generally as message handler entry 128) refers to code for the message handler 111 that is provided in the window Q scripts 104-3. Generally, in operation, the function FD code 110 causes a box 112 to appear in window Q 102-3 as the result of receiving a message 108 originating in the window Y scripts 104-2 (see the discussion of the flow chart in FIG. 4). The entries 122, 126, 128 shown in FIG. 3 are shown by way of example only and there is no requirement by the invention that each database 118 have any or all of the entries 122, 126, 128.

Figure 4:
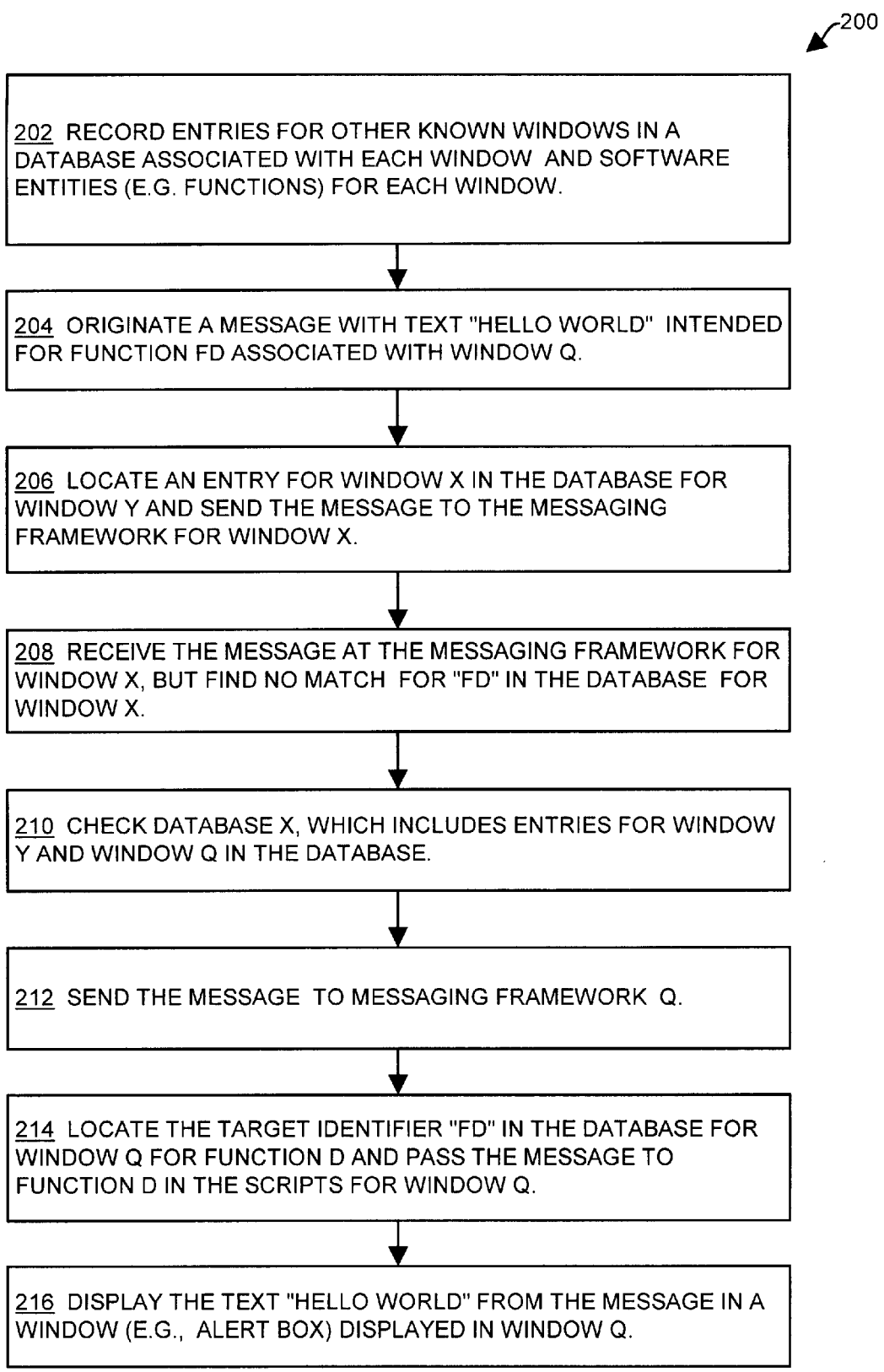
FIG. 4 is a flowchart of a procedure for recording entries in databases, sending a message between messaging frameworks based on the entries, and processing the message, according to the embodiment of the invention shown in FIG. 3.

FIG. 4 is a flowchart of a procedure 200 for recording entries 122, 126, 128 in databases 118, sending a message 108 between messaging frameworks 106 based on the entries 122, 126, and processing the message 108, according to the embodiment of the invention shown in FIG. 3.

In step 202, the scripts 104 for each window record entries 122 for other known windows 102 in the database 118 associated with each window 102 and record entries 126, 128 for software entities 40 (e.g. function entry 126-1 for function FD 110) for each window 102. For example, the window Q scripts 104-3 record entries for window X 122-4 and function FD 126-1 and message handler 128-1 in the database 118-3 associated with window Q 102-3.

In step 204, the scripts 104-2 for window Y originate a message 108 with the text "Hello World" intended for function FD 110 associated with window Q 102-3. The message 108 refers specifically to "FD" as the target reference 109, and this target reference 109 is an example of selection information 38 as shown in FIG. 1. The message 108 may originate in several different ways. A user of the computer system 20 may perform an action with the mouse or other input device in window Y 102-2 that causes the window Y scripts 104-2 to originate the message 108. The window Y scripts 104-2 may initiate the message 108 without direct user input; for example, via a timing mechanism that may cause the window Y scripts 104-2 to originate the message 108. In addition, the window Y scripts 104-2 may receive a previous message or event signal that causes the window Y scripts 104-2 to originate the message 108.

In step 206, the messaging framework 106-2 for window Y locates a window X entry 122-3 in the window Y database 118-2 and sends the message 108 to the messaging framework 106-1 for window X. If the window Y database 118-2 includes references to windows 102 other than the window X entry 122-3, then the messaging framework 106-2 would send the message 108 to those other windows 102 also.

In step 208, the window X messaging framework 106-1 receives the message 108 and checks the window X database 118-1 to determine if the database 118-1 includes a function entry 126 that matches the target reference "FD" 109 contained in the message 108. The window X messaging framework 106-1 does not find a match for the target reference "FD" 109 in the window X database 118-1.

In step 210, the window X messaging framework 106-1 determines that the window X database 118-1 does include an entry referring to window Y, 122-1, and an entry referring to window Q, 122-2.

In step 212, the window X messaging framework 106-1 sends the message 108 to the window Q messaging framework 106-3 based on the window Q entry 122-2 in the window X database 118-1, but, in this example, does not send the message 108 to the window Y messaging framework 106-2, because the message 108 originated from the window Y scripts 104-2.

In step 214, the window Q messaging framework 106-3 locates the target identifier "FD" entry 126-1 in the window Q database 118-3 and then passes the message 108 to the window Q scripts 104-3, which include the function D code 110. In one embodiment, the message 108 includes a filter that identifies more than one function 110 that can receive the message. For example, the message 108 can include a filter 130 that identifies one or more target identifiers 42 (e.g., functions 110) to receive the message 108 by a pattern or other approach that allows the identification of more than one target identifier 42. For example, suppose the filter 130 is "*D". The asterisk ("*") indicates a wild card that would cause the message 108 to be sent to all functions 110 with a "D" preceded by a character, such as "XD", "ZD", "5D", and other functions 110 having a similar pattern.

In step 216, the function D code 110 receives the message 108 as input and causes the text, "Hello World," from the message 108 to be displayed in a window 112 (e.g. JavaScript alert box), which is displayed in window Q, 102-3.

FIG. 5A, 5B, and 5C illustrate a sample HTML page 300-1, 300-2, 300-3 (referred to generally as sample HTML page 300), which shows sample code fragments 302 through 348 that record entries for windows 102, functions 126, and message handlers 128 in a database 118, and send messages 108 based on the recorded information, according to one embodiment of the invention. The HTML page 300 is provided as an example of only one implementation, which shows, for illustrative purposes, the sample code fragments 302 through 348 in one HTML page 300.

In an alternate multiple HTML page implementation, the sample code 302 through 348 is included in two or more HTML pages. For example, each HTML page provides its own sample code to include a JavaScript source file (see discussion of sample code 304 later). In addition, the script 104 in one HTML page typically defines and registers functions 126 and/or message handlers 128 (e.g., the functions 126 and/or message handler 128 as discussed later for sample code 310 through 328), and the script 104 in a different HTML page sends the message 108 to be received by the script 104 in the first HTML page (e.g., sends the message 108 to the functions 126 as discussed later for sample code 330 through 346).

In FIG. 5A, sample code 302 provides the header for the HTML page 300, which is capable of being displayed in a window (e.g., window 102) opened by a web browser.

Sample code 304 indicates an example of how to include a JavaScript source file (e.g., "message_framework.js") for the messaging framework 106 to be used by the sample code 306 through 348 in the HTML page 300.

Sample code 306 shows an example of how to open a new window with the name, "chatWin" and save the window handle into a variable, "chatWin".

Sample code 308 indicates an example of how to register a window handle, "chatWin", as a container (e.g., window entry 122 as shown in FIG. 3) to receive messages 108.

Sample code 310 indicates an example of how to set up a test function, "testFunc1" that can test remote function calls and sample code 312 indicates how to set up a second test function, "testFunc2" that can test remote function calls.

Sample code 314, in FIG. 5B, shows an example of how to register a function 110, "testFunc1 ", as a target to receive remote calls using the identifier 126, "testing1", registered in the database 118 (e.g., as a function entry 126 as shown in FIG. 3), and sample code 316 shows how to register a second function 110, "testFunc2", as a target to receive remote calls using the identifier 126, "testing2", registered in the database 118 (e.g., as a function entry 126 as shown in FIG. 3). The constant value "MSG_FUNCTION" indicates that the function is a function 110 (and not a message handler 111, which is indicated by the constant value "MSG_HANDLER", as discussed later).

Sample code 318 through 326 illustrates an example of how to set up a message handler 111 (e.g., "testHandler") to receive normal and extended message objects. For example, a messaging framework 106 instantiates a message object, including suitable message functions, such as a message send function, and message data, which can include default data and extended message data. Sample code 320 and 322 indicate that, if there is extended message data, the message handler 111 returns after displaying the data from the extended message structure in "mObj.myData". Sample code 324 indicates that, if the message object is a normal message object, data is displayed from the default message structure. Sample code 326 indicates that a valid receipt is returned, but no data is returned, from the message handler 111. Sample code 328 indicates how to register the function "testHandler", shown in sample code 318 through 326, as a message handler 111 in the database 118 (e.g., as a message handler 128, as shown in FIG. 3). The constant value "MSG_HANDLER" indicates that the function is a message handler 111. Message handlers 111 can add data to the message 36 or change the message's 36 current data, and the messaging frameworks 106 continue to distribute the message 36 with the new or altered data.

In another embodiment, the message 36 includes the function 44 (e.g., function object) as part of the message 36 (e.g., message object). Thus, the messaging module 32 can use the message 36 to distribute script code between application frames.

Sample code 330 indicates an example of how to send a synchronous event message, as indicated by the constant value, "MSG_EVENT". Sample code 332 indicates how to send an asynchronous event message, as indicated by the constant value, "MSG_ASYNC". The messages 36 in sample code 330 and 332 includes two strings of text, "string one" and "string two" to be used as input by the function 110, "testing1", which is the function 110 defined in sample code 310 as "testFunc1" and registered in the database 118 in sample code 314 with the identifier 126, "testing1".

Sample code 334, in FIG. 5C, indicates an example of how to set up and send a command message, as indicated by the constant value, "MSG_COMMAND". The message 36 includes two strings of text, "string one" and "string two" to be used as input by the function 110, "testing2", which is the function 110 defined in sample code 312 as "testFunc2" and registered in the database 118 in sample code 316 with the identifier 126, "testing2". Sample code 336 indicates how to resend the message set up in sample code 334.

Sample code 338 shows an example of how to display the results of the command messages set up, sent, and resent in sample code 334 and 336. JavaScript alert boxes display the results from "myAlert" from sample code 334 and "myAlert2" from sample code 336.

Sample code 340 indicates an example of how to send an extended synchronous event message, and sample code 342 shows how to send an extended asynchronous event message. In both sample code 340 and 342, the extended data, represented in this example by "this is extended data", is stored in "msg.myData".

Sample code 344 indicates an example of how to send an extended command message, with the returned results of the command stored in the variable "myResults". Sample code 346 displays the results of the command (i.e., displays "myResults" in an alert box).

Sample code 348 provides an example of the additional code that would be used to complete the HTML page 300. When the HTML page 300 is loaded for display, the HTML page 300 invokes the function "addDefaultContainers( )" which registers containers (e.g., windows 102 or frames) known to the instant HTML page 300, such as a parent container, an opener container, and/or other frames, in the database 118 (e.g., as window entries 122 under a container category 120, as shown in FIG. 3).

While this invention has been particularly shown and described with references to preferred embodiments thereof, it will be understood by those skilled in the art that various changes in form and details may be made therein without departing from the spirit and scope of the invention as defined by the appended claims.

For example, the display code 28, 30 is not required to be a script or JavaScript in an HTML page, but can be other types of code or script suitable for use in connection with a display construct 24, 26 displayed on the display 22 of a computer system 20. The display code 28, 30 may be used with a page other than an HTML page, such as an XML (extended markup language) page or other type of markup or tagged document page suitable for use in generating windows to be displayed in a computer display 22. The display code 28, 30 is not required to be displayed in connection with a web browser, but can be displayed in connection with any suitable type of graphics display application that generates display constructs 24, 26 for display on a computer display 22.

In an additional example, the approach of the invention is not limited to display constructs 24, 26 shown on one computer display 22, but can also be applied to display constructs 24, 26 presented on computer displays 22 on different computer systems 20 in communication through a network, modem, direct line connection, or other methods, as is known in the art.

In addition, the number of display constructs 24, 26 or windows 102 used in connection with the techniques of the invention is not limited to the two display constructs 24, 26 shown in FIG. 1 or the three windows 102 shown in FIG. 3.

Furthermore, the database 118 is not required by the invention to any particular type of database, but can be any type of database suited for use with a computer system 20 and storing the categories 120, 124 and entries 122, 126, 128 as described herein.

The foregoing description of embodiments of the invention are not meant to be limiting. Rather, any limitations to embodiments of the invention are presented in the claims that follow Appendix A.

APPENDIX A

The following appendix, entitled "Messaging Framework Sample Source Code", provides sample source code suitable for use in implementing one approach of the invention and is meant to be considered as part of the detailed disclosure of embodiments of the invention. This embodiment, however, is to be considered as an example only, and it is to be understood that this example is not meant to be limiting of the invention.

MESSAGING FRAMEWORK SAMPLE SOURCE CODE

```
//
// message_framework
//
// Constants
var MSG_EVENT       = 10000;
var MSG_ASYNC       = 10001;
var MSG_COMMAND     = 10002;
var MSG_HANDLER     = 20000;
var MSG_FUNCTION    = 20001;
// Containers and settings
var doDetectContainers = false;
var asyncObj = null ;
var remoteStore = new Array ( ) ;
var handleStore = new Array ( ) ;
var contStore = new Array ( ) ;
function addDefaultContainers ( )
{
    // Adds all possible containers
    doDetectContainers = true;
} ;
function detectContainers ( )
{
    // Adds all possible containers
    doDetectContainers = false;
    addParentContainer( ) ;
    addOpenerContainer( ) ;
    addFrameContainers( ) ;
} ;
function addParentContainer( )
{
    // Adds the parent to the list of message receipients
    if (self && self.parent && !self.parent.closed) (new Container(self.parent)).add("parent") ;
} ;
```

-continued

MESSAGING FRAMEWORK SAMPLE SOURCE CODE

```
function addOpenerContainer( )
{
    // Adds the opener to the list of message receipients
    if (self && self.opener && !self.opener.closed) (new
Container(self.opener)).add("opener") ;
} ;
function addFrameContainers( )
{
    // Adds the frames to the list of message receipients
    for (var x = 0; self && self.frames && self.frames.length &&
self.frames.length > 0
        && x < self.frames.length && self.frames[x] &&
!self.frames[x].closed; x++)
            (new Container(self.frames[x])).add("frame" + x) ;
} ;
function __target__add(name, filter, type)
{
    // This adds a target function as a handler or as a remote function
    this.name = name;
    this.filter = filter;
    if (type && type == MSG__HANDLER) addHandler(this) ;
    else if (type && type == MSG__FUNCTION) addFunction(this) ;
} ;
function Target(target)
{
    // Sets up defaults for a named function
    this.target = target;
    this.add = __target__add;
} ;
function MessageReceipt(proceed, results)
{
    // This helps us determine scope for these events
    this.proceed = proceed;
    this.results = results;
    this.validReceipt = true;
} ;
function addFunction(remoteFunc)
{
    // Stores the function so we can use messages to invoke it
    if (!hasObjInArray(remoteStore, remoteFunc))
remoteStore[remoteStore.length] = remoteFunc;
} ;
function addHandler(handler)
{
    // Stores the handler so we can pass message objects to it
    if (!hasObjInArray(handleStore, handler))
handleStore[handleStore.length] = handler;
} ;
function dropHandler(handler)
{
    // Trims the MessageHandler out of storage
    handleStore = dropObjFromArray(handleStore, handler) ;
} ;
function dropFunction(remoteFunc)
{
    // Trims the reference to the function out of storage
    remoteStore = dropObjFromArray(remoteStore, remoteFunc) ;
} ;
function dropObjFromArray(arrayObj, objToDrop)
{
    // Trims objects from arrays
    if (!objToDrop || !arrayObj) return;
    var attribs = new Array( ) ;
    for (attr in objToDrop)
        if (attr) attribs[attribs.length] = attr;
    var goodArray = new Array( ) ;
    for (var x = ; x < arrayObj.length; x++)
    {
        if (!arrayObj[x]) continue;
        var different = false;
        for (var y = 0; y < attribs.length; y++)
            if (!arrayObj[x] [attribs[y || arrayObj[x]
[attribs[y]] != objToDrop[attribs[y]])
                different = true;
        if (different) goodArray[goodArray.length] = arrayObj[x] ;
    }
    objToDrop = null;
```

-continued

MESSAGING FRAMEWORK SAMPLE SOURCE CODE

```
    arrayObj.length = 0;
    arrayObj = null;
    return goodArray;
} ;
function hasObjInArray(arrayObj, obj)
{
    // Matches objects in arrays
    if (!obj || !arrayObj) return false;
    var attribs = new Array( ) ;
    for (attr in obj)
        if (attr) attribs[attribs.length] = attr;
    var hasMatch = false;
    for (var x = 0; x < arrayObj.length && !hasMatch; x++)
    {
        if (!arrayObj[x]) continue;
        var different = false;
        for (var y = 0; y < attribs.length; y++)
            if (!arrayObj[x] [attribs[y]] || arrayObj[x]
[attribs[y]] != obj[attribs[y]])
                different = true;
        if (!different) hasMatch = true;
    }
    return hasMatch;
} ;
function dropMatchFromArray(arrayObj, attrName, attrVal)
{
    // Trims objects from arrays
    if (!attrName || !arrayObj) return;
    var goodArray = new Array( ) ;
    for (var x = 0; x < arrayObj.length; x++)
    {
        if (!arrayObj[x]) continue;
        if (!arrayObj[x] [attrName] || arrayObj[x] [attrName] !=
attrVal)
            goodArray[goodArray.length] = arrayObj[x] ;
    }
    arrayObj.length = 0 ;
    arrayObj = null ;
    return goodArray ;
} ;
function hasMatchInArray(arrayObj, attrName, attrVal)
{
    // Matches objects in arrays
    if (!attrName || !arrayObj) return false;
    var hasMatch = false;
    for (var x = 0; x < arrayObj.length && !hasMatch; x++)
    {
        if (!arrayObj[x]) continue;
        if (arrayObj[x] [attrName] && arrayObj[x] [attrName] ==
attrVal) hasMatch = true;
    }
    return hasMatch;
} ;
function Container(target)
{
    // Sets up defaults for containers
    this.target = target;
    this.add = __container__add;
} ;
function __container__add(name)
{
    // This links a window handle to receive a message
    if (!name || !this.target || hasMatchInArray(contStore, "name", name)
|| this.target == self) return;
    this.name = name;
    contStore[contStore.length] = this;
} ;
function dropContainer(name)
{
    // This dumps a window handle out of storage
    contStore = dropMatchFromArray(contStore, "name", name) ;
} ;
function __message__send(name, filter, type)
{
    // Sends the message
    if (name)
    {
```

-continued

MESSAGING FRAMEWORK SAMPLE SOURCE CODE

```
            this.name = name;
            this.filter = filter;
            this.type = type;
        }
        if (!this.created) this.created = new Date( ) ;
        val results = null;
        if (this.type == MSG_ASYNC)
        {
            this.type = MSG_EVENT;
            asyncObj = this;
            setTimeout("if(asyncObj)asyncObj.send( ) ;", 1) ;
        }
        else results = sendMessage(this).results;
        return results;
} ;
function Message( )
{
    // Sets up defaults for Message objects
    this.source = null;
    this.maxhops = null;
    this.data = arguments;
    this.send = __message_send;
        this.name = null;
        this.filter = null;
        this.type = null;
} ;
function handleMessage(mObj)
{
    // Handles messages in local system
    var syncResults = new MessageReceipt(true, null) ;
    if (mObj == null || mObj.type == null) return syncResults;
    for (var x = 0; x < remoteStore.length && syncResults.procees; x++)
    {
        if (!remoteStore[x] || !remoteStore[x].target) continue;
        if ((remoteStore[x].name == null || remoteStore[x].name ==
nObj.name) &&
            (remoteStore[x].filter == null || remoteStore[x].filter ==
mObj.filter))
        {
            var evalStr = "remoteStore[x].target(";
            for (var y = 0; y < mObj.data.length; y++)
                evalStr += ((y!=0)?",":"")+"mObj.date["+y+"]";
            evalStr += ")";
            syncResults = new MessageReceipt((mObj.type ==
MSG_EVENT), eval(evalStr)) ;
        }
    }
    for (var x = 0; x < handlStore.length && handleStore[x] &&
handleStore[x].target && syncResults.proceed; x++)
    {
        if ((handleStore[x].name == null || handleStore[x].name ==
mObj.name) &&
            (handleStore[x].filter == null || handleStore[x].filter ==
mObj.filter))
        {
            syncResults = handleStore[x].target(mObj) ;
            if (syncResults == null || !syncResults.validReceipt)
syncResults = new MessageReceipt(true, null) ;
        }
    }
    return syncResults;
} ;
function sendMessage(mObj, depth, from)
{
    // Passes the message around after attempting to handle it
    if (doDetectContainers) detectContainers( ) ;
    var resultObj = null;
    if (depth == null) depth = 0;
    if (!mObj.maxhops || mObj.maxhops >= depth)
    {
        resultObj = handleMessage(mObj) ;
        if (resultObj.proceed && contStore.length > 0)
            for (var x = 0; x < contStore.length && resultObj.proceed;
x++)
            {
                if (!contStore[x] || !contStore[x].target ||
contStore[x].target.closed)
```

-continued

MESSAGING FRAMEWORK SAMPLE SOURCE CODE

```
                {
                    if (contStore[x] && contStore[x].name != null)
dropContainer(contStore[x].name) ;
                    continue;
                }
                if (!contStore[x].target.sendMessage) continue;
                if (contStore[x].target != from &&
contStore[x].target != this)
                    resultObj = contStore[x].target.sendMessage
(mObj, depth + 1, this) ;
            }
    }
    if (resultObj == null) resultObj = new MessageReceipt(true, null) ;
    return resultObj;
} ;
// End of message_framework
End of APPENDIX A
```

What is claimed is:

1. A method for communicating messages between display constructs presented on a display of a computer system, comprising the steps of:
   recording a plurality of target identifiers associated with a plurality of display constructs in a database, each target identifier identifying at least one aspect of a respective display construct;
   receiving a message comprising selection information suitable for use in selecting one of the display constructs to receive the message;
   forwarding the message to one of the display constructs based on the selection information and the target identifiers in the database; and
   wherein the step of receiving the message comprises receiving the message independently of an identification of a specific display construct suitable for receiving the message.

2. The method of claim 1, wherein the step of recording the plurality of target identifiers comprises recording identities of software entities, each software entity providing processing instructions in relation to each respective display construct.

3. The method of claim 1, wherein the step of forwarding the message comprises traversing the database to select a set of display constructs based on the selection information and forwarding the message to the set of display constructs.

4. The method of claim 1, wherein the step of forwarding the message comprises using a filter to select at least one of the display constructs and forwarding the message to the at least one display construct.

5. The method of claim 1, further comprising the steps of:
   instantiating a message framework in the computer system; and
   instantiating a message object in the messaging framework, wherein the message object comprises associated message functions and message data.

6. A method as in claim 1, wherein receiving the message includes receiving the message from a first software entity, the message including selection information that references a software function associated with at least one other software entity supporting a corresponding display construct to which the message is directed, the method further comprising:
   processing the selection information in the message to identify a second software entity that includes the software function;

retrieving a target identifier associated with the second software entity; and forwarding the message to the second software entity based on use of the retrieved target identifier.

7. A method as in claim 6, wherein the selection information includes a software function name associated with the software function to which the message is directed.

8. A method as in claim 7 further comprising:

maintaining a database of multiple software function names and corresponding names of software entities that include the multiple software functions, each of the names of software entities having a corresponding target identifier in the database;

wherein retrieving the target identifier associated with the second software entity includes selecting the target identifier from the database based on the software function to which the message is directed; and wherein the first software entity transmits the message not knowing to which specific software entity the message is directed.

9. A method as in claim 8, further comprising:

processing the selection information to identify that a third software entity includes the software function;

retrieving a target identifier from the database associated with the third software entity; and forwarding the message to the third software entity based on use of the target identifier associated with the third software entity.

10. A method as in claim 9 further comprising:

receiving the forwarded message at the second software entity; and at the second software entity, forwarding the message to a particular function in the second software entity based on the software function name.

11. A method as in claim 7, wherein the selection information includes a string of text that is compared to multiple software function names, the method further comprising:

in response to matching the string of text and at least a portion of the multiple software function names, forwarding the message to each of multiple software entities that include respective software functions having software function names that at least partially match the string of text.

12. An apparatus for communicating messages between display constructs presented on a display of a computer system, comprising:

a database; and a messaging module, wherein the messaging module is configured to:

record a plurality of target identifiers associated with a plurality of display constructs in a database, each target identifier identifying at least one aspect of a respective display construct;

receive a message comprising selection information suitable for use in selecting one of the display constructs to receive the message;

forward the message to one of the display constructs based on the selection information and the target identifiers in the database; and wherein the messaging module is configured to receive the message independently of an identification of a specific display construct suitable for receiving the message.

13. The apparatus of claim 12, wherein each target identifier comprises the identity of a software entity that provides processing instructions in relation to each respective display construct.

14. The apparatus of claim 12, wherein the messaging module is configured to traverse the database to select a set of display constructs based on the selection information and forward the message to the set of display constructs.

15. The apparatus of claim 12, wherein the messaging module uses a filter to select at least one of the display constructs and the messaging module forwards the message to the at least one display construct.

16. The apparatus of claim 12, wherein the messaging module is a messaging framework instantiated in the computer system; the message is an instantiation of a message object in the messaging framework; and the message comprises associated message functions and message data.

17. The apparatus of claim 12, wherein the display constructs are windows displayed in at least one network browser executing on the computer system, and each target identifier identifies one of the windows.

18. An apparatus as in claim 12, wherein the messaging module is configured to receive the message from a first software entity, the message including selection information that references a software function associated with at least one other software entity supporting a corresponding display construct to which the message is directed, the messaging module further configured to:

process the selection information in the message to identify a second software entity that includes the software function;

retrieve a target identifier associated with the second software entity; and forward the message to the second software entity based on use of the retrieved target identifier.

19. An apparatus as in claim 18, wherein the selection information includes a software function name associated with the software function to which the message is directed.

20. An apparatus as in claim 19, wherein the messaging module is configured to:

maintain a database of multiple software function names and corresponding names of software entities that include the multiple software functions, each of the names of software entities having a corresponding target identifier in the database;

wherein retrieving the target identifier associated with the second software entity includes selecting the target identifier from the database based on the software function to which the message is directed; and wherein the first software entity transmits the message not knowing to which software entity the message is directed.

21. An apparatus as in claim 20, wherein the messaging module is further configured to:

process the selection information to identify that a third software entity includes the software function;

retrieve a target identifier from the database associated with the third software entity; and forward the message to the third software entity based on use of the target identifier associated with the third software entity.

22. An apparatus as in claim 21, wherein the second software entity receives the forwarded message at the second software entity, and the second software entity forwards the message to a particular function in the second software entity based on the software function name.

23. An apparatus as in claim 19, wherein the selection information includes a string of text that is compared to multiple software function names, the messaging module configured to:

in response to matching the string of text and at least a portion of the multiple software function names, forward the message to each of multiple software entities that include respective software functions having software function names that at least partially match the string of text.

24. An apparatus for communicating messages between display constructs presented on a display of a computer system, comprising:
   a database; and
   a means for processing messages, wherein the processing means is configured to:
      record a plurality of target identifiers associated with a plurality of display constructs in a database, each target identifier identifying at least one aspect of a respective display construct;
      receive a message comprising selection information suitable for use in selecting one of the display constructs to receive the message;
      forward the message to one of the display constructs based on the selection information and the target identifiers in the database; and
      wherein receiving the message comprises receiving the message independently of an identification of a specific display construct suitable for receiving the message.

25. The apparatus of claim 24, wherein each target identifier comprises the identity of a software entity that provides processing instructions in relation to each respective display construct.

26. A computer program product that includes a computer readable medium having instructions stored thereon for communicating messages between display constructs presented on a display of a computer system, such that the instructions, when carried out by a computer, cause the computer to perform the steps of:
   recording a plurality of target identifiers associated with a plurality of display constructs in a database, each target identifier identifying at least one aspect of a respective display construct;
   receiving a message comprising selection information suitable for use in selecting one of the display constructs to receive the message;
   forwarding the message to one of the display constructs based on the selection information and the target identifiers in the database; and
   wherein the step of receiving the message comprises receiving the message independently of an identification of a specific display construct suitable for receiving the message.

27. The computer program product of claim 26, wherein the step of recording the plurality of target identifiers comprises recording identities of software entities, each software entity providing processing instructions in relation to each respective display construct.

28. A method for communicating messages between display constructs presented on a display of a computer system, comprising the steps of:
   recording a target identifier that identifies a software entity associated with a first display construct;
   generating a message comprising the target identifier based on a request from a second display construct;
   transferring the message from the second display construct to the software entity in the first display construct based on the target identifier; and
   wherein the step of generating the message comprises generating the message independently of an identification of the first display construct and identifying the first display construct based on the target identifier recorded in the database.

29. An apparatus for communicating messages between display constructs presented on a display of a computer system, comprising:
   a database;
   a first messaging module associated with a first display construct; and
   a second messaging module associated with a second display construct, wherein the second messaging module is configured to:
      record in the database a target identifier that identifies a software entity that provides processing instructions in relation to the first display construct;
      generate a message comprising the target identifier based on a request from the second display construct;
      transfer the message to the first messaging module based on the target identifier recorded in the database; and
      wherein the second messaging module is configured to generate the message independently of an identification of the first display construct.

30. The apparatus of claim 29, wherein the first messaging module and second messaging modules are JavaScript code associated with at least one hypertext markup language (HTML) page and the first display construct and second display construct are browser windows.

31. The apparatus of claim 29, wherein the software entity is one of a function and a message handler.

32. An apparatus for communicating messages between display constructs presented on a display of a computer system, comprising:
   a database;
   a first means for processing messages associated with a first display construct; and
   a second means for processing messages associated with a second display construct, wherein the second processing means is configured to:
      record in the database a target identifier that identifies a software entity that provides processing instructions in relation to the first display construct;
      generate a message comprising the target identifier based on a request from the second display construct;
      transfer the message to the first processing means based on the target identifier recorded in the database; and
      wherein generating the message comprises generating the message independently of an identification of the first display construct and identifying the first display construct based on the target identifier recorded in the database.

33. A computer program product that includes a computer readable medium having instructions stored thereon for communicating messages between display constructs presented on a display of a computer system, such that the instructions, when carried out by a computer, cause the computer to perform the steps of:
   recording a target identifier that identifies a software entity associated with a first display construct;
   generating a message comprising the target identifier based on a request from a second display construct;
   transferring the message from the second display construct to the software entity in the first display construct based on the target identifier; and
   wherein the step of generating the message comprises generating the message independently of an identification of the first display construct and identifying the first display construct based on the target identifier recorded in the database.

34. A method for communicating messages associated with display constructs presented on a display of a computer system, the method comprising:

receiving a message from a first software entity, the message including selection information that references a software function associated with at least one other software entity supporting a corresponding display construct to which the message is directed;

processing the selection information in the message to identify a second software entity that includes the software function;

retrieving a target identifier associated with the second software entity;

forwarding the message to the second software entity based on use of the retrieved target identifier; and wherein the first software entity transmitting the message does not include a target identifier in the message indicating to which software entity the message is directed.

35. A method as in claim 34, wherein the selection information includes a software function name associated with a corresponding software function to which the message is directed.

36. A method as in claim 35, further comprising:

maintaining a database of names of multiple software functions and corresponding software entities that include the multiple software functions, each of the software entities including a corresponding target identifier in the database;

wherein retrieving the target identifier associated with the second software entity includes selecting the target identifier from the database based on the software function to which the message is directed; and wherein the first software entity transmits the message not knowing to which software entity the message is directed.

37. A method as in claim 36 further comprising:

processing the selection information to identify that a third software entity includes the software function;

retrieving a target identifier from the database associated with the third software entity; and forwarding the message to the third software entity based on use of the target identifier associated with the third software entity.

38. A method as in claim 35, wherein the selection information includes a string of text compared to multiple software function names, the method further comprising:

in response to matching the string of text and at least a portion of the multiple software function names, forwarding the message to each of multiple software entities that include respective software functions having software function names that at least partially match the string of text.

39. A method as in claim 36, further comprising:

receiving the forwarded message at the second software entity; and at the second software entity, forwarding the message to a particular function in the second software entity based on the software function name.

* * * * *

UNITED STATES PATENT AND TRADEMARK OFFICE
CERTIFICATE OF CORRECTION

PATENT NO.     : 6,753,886 B1
DATED          : June 22, 2004
INVENTOR(S)    : Ryan J. Schuft Page 1 of 1

It is certified that error appears in the above-identified patent and that said Letters Patent is hereby corrected as shown below:

Column 26,
Line 25, "A method as in claim 36," should read -- A method as in claim 36 --

Signed and Sealed this

Twenty-eighth Day of December, 2004

JON W. DUDAS
*Director of the United States Patent and Trademark Office*